United States Patent
Ashrafi et al.

(10) Patent No.: US 10,759,409 B2
(45) Date of Patent: Sep. 1, 2020

(54) TECHNIQUES FOR DETECTING AND MONITORING UNINTENDED POWERTRAIN PROPULSIVE TORQUE IN HYBRID VEHICLES

(71) Applicants: Behrouz Ashrafi, Northville, MI (US); Feisel F Weslati, Troy, MI (US); Sathya Manivasagam, Bloomfield Hills, MI (US)

(72) Inventors: Behrouz Ashrafi, Northville, MI (US); Feisel F Weslati, Troy, MI (US); Sathya Manivasagam, Bloomfield Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 325 days.

(21) Appl. No.: 15/885,083

(22) Filed: Jan. 31, 2018

(65) Prior Publication Data
US 2019/0232940 A1     Aug. 1, 2019

(51) Int. Cl.
*B60W 20/10*     (2016.01)
*B60W 10/08*     (2006.01)
(Continued)

(52) U.S. Cl.
CPC ............ *B60W 20/10* (2013.01); *B60K 6/445* (2013.01); *B60W 10/06* (2013.01); *B60W 10/08* (2013.01);
(Continued)

(58) Field of Classification Search
CPC .... B60W 20/10; B60W 30/188; B60W 10/06; B60W 50/038; B60W 10/18; B60W 20/50; B60W 30/18054; B60W 30/18118; B60W 10/192; B60W 50/10; B60W 10/08; B60W 2540/16; B60W 2510/105; B60W 2520/28; B60W 2510/1015; B60W 2710/186;
(Continued)

(56) References Cited

U.S. PATENT DOCUMENTS 8,775,046 B2   7/2014   Kaster et al.
9,090,245 B2   7/2015   Livshiz et al.
(Continued)

OTHER PUBLICATIONS

International Search Report and Written Opinion dated Apr. 15, 2019 for International Application No. PCT/US2019/015749, International Filing Date Jan. 30, 2019.

*Primary Examiner* — Jonathan M Dager
*Assistant Examiner* — Jean W Charleston
(74) *Attorney, Agent, or Firm* — Ralph E Smith

(57) ABSTRACT

A control system and method for a hybrid vehicle involve controlling a hybrid powertrain comprising an engine and a transmission having one or more electric motors and not comprising a decoupling mechanism therebetween, detecting an operating condition where the transmission is in neutral and the vehicle is moving at a speed less than a low speed threshold, and in response to detecting the operating condition: determining a desired propulsive torque of the powertrain, determining an actual propulsive torque at the driveline, calculating a torque difference between the actual and desired propulsive torques over a period, comparing the calculated torque difference to a first movement threshold, and when the calculated torque difference exceeds the first movement threshold, applying an electric parking brake (EPB) of the vehicle.

16 Claims, 3 Drawing Sheets

(51) Int. Cl.
| | |
|---|---|
| *B60W 50/10* | (2012.01) |
| *B60W 10/192* | (2012.01) |
| *B60W 30/18* | (2012.01) |
| *B60K 6/445* | (2007.10) |
| *B60W 20/50* | (2016.01) |
| *B60W 10/18* | (2012.01) |
| *B60W 50/038* | (2012.01) |
| *B60W 10/06* | (2006.01) |
| *B60W 30/188* | (2012.01) |

(52) U.S. Cl.
CPC .......... *B60W 10/18* (2013.01); *B60W 10/192* (2013.01); *B60W 20/50* (2013.01); *B60W 30/188* (2013.01); *B60W 30/18054* (2013.01); *B60W 30/18118* (2013.01); *B60W 50/038* (2013.01); *B60W 50/10* (2013.01); *B60W 2420/22* (2013.01); *B60W 2510/083* (2013.01); *B60W 2510/104* (2013.01); *B60W 2510/105* (2013.01); *B60W 2510/1015* (2013.01); *B60W 2520/28* (2013.01); *B60W 2540/16* (2013.01); *B60W 2710/083* (2013.01); *B60W 2710/186* (2013.01)

(58) Field of Classification Search
CPC ....... B60W 2420/22; B60W 2510/104; B60W 2510/083; B60W 2710/083; B60K 6/445
USPC .......................................................... 701/22
See application file for complete search history.

(56) References Cited

U.S. PATENT DOCUMENTS

| | | |
|---|---|---|
| 9,126,592 B2 | 9/2015 | Park et al. |
| 9,547,314 B2 | 1/2017 | Vernacchia et al. |
| 2004/0254045 A1 | 12/2004 | McGee et al. |
| 2005/0246081 A1 | 11/2005 | Bonnet et al. |
| 2005/0256623 A1* | 11/2005 | Hubbard ................ B60L 15/00 701/54 |
| 2010/0168967 A1* | 7/2010 | Dlugoss .......... B60W 30/18054 701/49 |
| 2012/0059539 A1 | 3/2012 | Arnett et al. |
| 2012/0290187 A1 | 11/2012 | Oesterreicher et al. |
| 2013/0151074 A1 | 6/2013 | Takeuchi et al. |
| 2014/0141915 A1 | 5/2014 | Naqi et al. |
| 2014/0244084 A1 | 8/2014 | Raftry |
| 2015/0088353 A1* | 3/2015 | Murakami ................ B60L 7/26 701/22 |
| 2015/0307079 A1* | 10/2015 | Hancasky ............ B60W 10/06 477/4 |
| 2016/0096522 A1* | 4/2016 | Ortmann ................. B60K 6/36 477/5 |
| 2018/0244261 A1* | 8/2018 | Ruybal ................. B60K 6/387 |
| 2019/0135265 A1* | 5/2019 | Shin ..................... G05D 1/0274 |

* cited by examiner

TECHNIQUES FOR DETECTING AND MONITORING UNINTENDED POWERTRAIN PROPULSIVE TORQUE IN HYBRID VEHICLES

FIELD

The present application generally relates to hybrid vehicles and, more particularly, to techniques for detecting and monitoring unintended hybrid powertrain propulsive torque.

BACKGROUND

A hybrid vehicle powertrain typically includes a torque generating system comprising an engine and one or more electric motors that are each configured to generate torque for a driveline of the powertrain. Conventional transmissions include a disconnect or decoupling clutch disposed between a shaft of the driveline and a shaft of the torque generating system. This clutch is utilized, for example, to decouple the torque generating system from the driveline when the transmission is in neutral. Some transmissions, however, do not have this disconnect or decoupling clutch disposed between the driveline and torque generating system. Thus, in neutral, a control system controls the engine and the one or more electric motors to generate positive/negative torques that sum to zero torque at the driveline. In some cases, however, the torque output by the torque generating system to the driveline fluctuates from zero, which results in potential movement of the vehicle. Accordingly, while such transmissions and control systems work well for their intended purpose, there remains a need for improvement in the relevant art.

SUMMARY

According to one aspect of the invention, a system for a hybrid vehicle is presented. In one exemplary implementation, the system comprises an electric parking brake (EPB) configured to prevent movement at a driveline of the vehicle and a control system configured to: control a hybrid powertrain of the vehicle, the powertrain comprising an engine and a transmission comprising one or more electric motors, wherein the engine and the one or more electric motors are directly coupled to the driveline of the vehicle without a decoupling mechanism therebetween; detect an operating condition where the transmission is in neutral and the vehicle is moving at a speed less than a low speed threshold; and in response to detecting the operating condition: determine a desired propulsive torque of the powertrain; determine an actual propulsive torque at the driveline; calculate a torque difference between the actual and desired propulsive torques over a period; compare the calculated torque difference to a first movement threshold; and when the calculated torque difference exceeds the first movement threshold, apply the EPB of the vehicle.

In some implementations, the control system is configured to: determine whether the calculated torque difference is intended or unintended by a driver of the vehicle; when the calculated torque difference is intended by the driver, not applying the EPB; and when the calculated torque difference is unintended by the driver and exceeds the first movement threshold, applying the EPB. In some implementations, the control system is configured to: determine that the calculated torque difference is unintended by the driver when a shaft of the driveline is driving an output shaft of the transmission; and determine that the calculated torque difference is intended by the driver when the transmission output shaft is driving the driveline shaft.

In some implementations, the control system is configured to determine whether the transmission output shaft is driving the driveline shaft or vice-versa based on measurements from one or more position or speed sensors for one or more of the transmission output shaft and the driveline shaft. In some implementations, each electric motor comprises a resolver that outputs a position indicative of a position of the transmission output shaft, and wherein the control system is configured to determine whether the transmission is driving the driveline or vice-versa based on the position of the transmission output shaft. In some implementations, the control system is configured to determine whether the transmission is driving the driveline or vice-versa by utilizing a strain gauge configured to measure a force exerted by one or more gear teeth associated with the transmission output shaft or the driveline shaft. In some implementations, the control system is configured to determine that the driveline shaft is driving the transmission output shaft based on a back electro-motive force (EMF) at one of the one or more electric motors.

In some implementations, the control system is further configured to set a desired torque of each of the engine and the one or more electric motors to zero when the calculated torque difference exceeds a second movement threshold that is greater than the first movement threshold. In some implementations, the transmission comprises two electric motors and one or more planetary gear sets. In some implementations, when the transmission is in neutral and the engine is on and generating a first torque, the control system is configured to control the two electric motors to generate, via the one or more planetary gear sets, an opposite second torque such that an output torque at the driveline is zero.

According to another aspect of the invention, a method of operating a hybrid vehicle is presented. In one exemplary implementation, the method comprises controlling, by a control system, a hybrid powertrain comprising an engine and a transmission comprising one or more electric motors, wherein the engine and the one or more electric motors are directly coupled to a driveline of the vehicle without a decoupling mechanism therebetween; detecting, by the control system, an operating condition where the transmission is in neutral and the vehicle is moving at a speed less than a low speed threshold; and in response to detecting the operating condition: determining, by the control system, a desired propulsive torque of the powertrain; determining, by the control system, an actual propulsive torque at the driveline; calculating, by the control system, a torque difference between the actual and desired propulsive torques over a period; comparing, by the control system, the calculated torque difference to a first movement threshold; and when the calculated torque difference exceeds the first movement threshold, applying, by the control system, an EPB of the vehicle.

In some implementations, the method further comprises: determining, by the control system, whether the calculated torque difference is intended or unintended by a driver of the vehicle; when the calculated torque difference is intended by the driver, not applying, by the control system, the EPB; and when the calculated torque difference is unintended by the driver and exceeds the first movement threshold, applying, by the control system, the EPB. In some implementations, the method further comprises: determining, by the control system, that the calculated torque difference is unintended by the driver when a shaft of the driveline is driving an output shaft of the transmission; and determining, by the control system, that the calculated torque difference is intended by the driver when the transmission output shaft is driving the driveline shaft.

In some implementations, determining whether the transmission output shaft is driving the driveline shaft or vice-versa is based on measurements from one or more position or speed sensors for one or more of the transmission output shaft and the driveline shaft. In some implementations, each electric motor comprises a resolver that outputs a position indicative of a position of the transmission output shaft, and wherein determining whether the transmission is driving the driveline or vice-versa is based on the position of the transmission output shaft. In some implementations, determining whether the transmission is driving the driveline or vice-versa comprises utilizing, by the control system, a strain gauge configured to measure a force exerted by one or more gear teeth associated with the transmission output shaft or the driveline shaft. In some implementations, determining that the driveline shaft is driving the transmission output shaft is based on a back EMF at one of the one or more electric motors.

In some implementations, the method further comprises setting, by the control system, a desired torque of each of the engine and the one or more electric motors to zero when the calculated torque difference exceeds a second movement threshold that is greater than the first movement threshold. In some implementations, the transmission comprises two electric motors and one or more planetary gear sets. In some implementations, the method further comprises when the transmission is in neutral and the engine is on and generating a first torque, controlling, by the control system, the two electric motors to generate, via the one or more planetary gear sets, an opposite second torque such that an output torque at the driveline is zero.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As discussed above, there remains a need for improvement for hybrid vehicle transmissions and control systems when there is no disconnect or decoupling clutch disposed between the torque generating system (e.g., engine+one or more electric motors) and driveline shafts. Accordingly, techniques are presented for detecting and monitoring unintended powertrain propulsive torque in hybrid vehicles. These techniques further include various remedial actions based on the detecting/monitoring. There are many causes of unintended propulsive powertrain torque, such as, but not limited to, computation error, memory corruption, and the inertia or responsiveness of various components. The benefits of these techniques include improved vehicle safety by preventing unintended powertrain torque from causing the vehicle to unexpectedly move, while also allowing the vehicle to move when the propulsive torque is intended, e.g., when a driver of the vehicle is pushing the vehicle or the vehicle is on a hill or a grade and thus is being moved by gravity.

Figure 1:
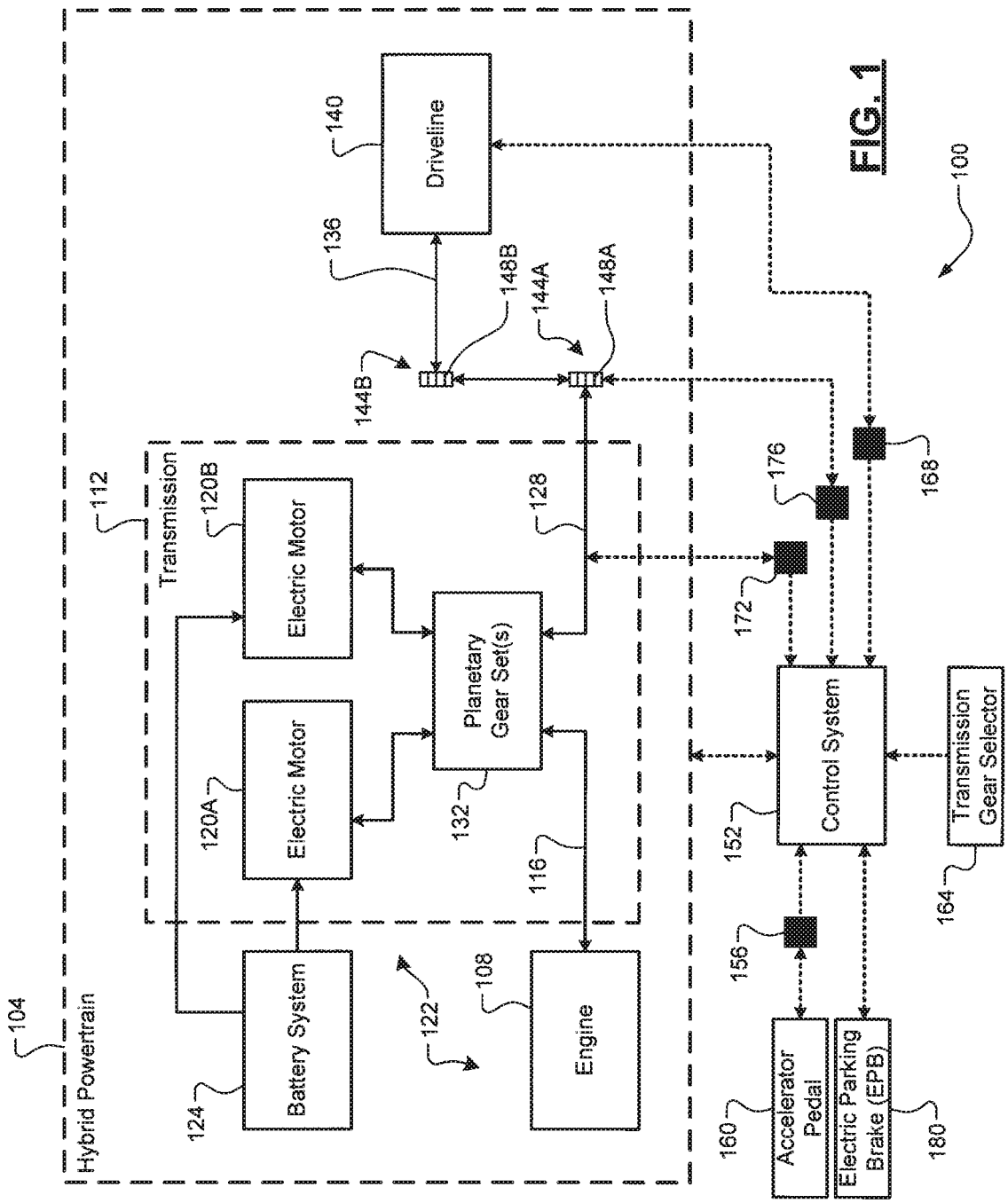
FIG. 1 is a functional block diagram of an example hybrid vehicle according to the principles of the present disclosure.

Referring now to FIG. 1, a functional block diagram of an example hybrid vehicle 100 is illustrated. Non-limiting examples of the vehicle include a battery electric vehicle (BEV) and a plug-in hybrid electric vehicle (PHEV). The vehicle 100 includes a hybrid powertrain 104 comprising an engine 108 and a transmission 112. The engine 108 is configured to combust an air/fuel mixture within cylinders to generate drive torque at a crankshaft 116, which is coupled to one of a plurality of planetary gear sets 132 of the transmission 112. In one exemplary implementation, the transmission 112 comprises two electric motors 120A and 120B (collectively, "electric motors 120") that are each powered by a battery system 124 and configured to generate torque that is transmitted to an output shaft 128 of the transmission 112 ("transmission output shaft 128") via one or more of the planetary gear sets 132. The engine 108 and the electric motors 120 are also referred to collectively herein as "torque generating system 122."

As described herein and shown in FIG. 1, the transmission 112 could also be referred to as a continuously variable transmission (CVT) or an electrically variable transmission (EVT). In one exemplary implementation, the crankshaft 116 is coupled to a first planetary gear set 132, which is in turn connected to one of the electric motors 120. In this exemplary implementation, the other electric motor 120 is connected to one or more other planetary gear sets 132, and one or more of the planetary gear sets 132 is coupled to the transmission output shaft 128. While two electric motors 120 are illustrated herein, it will be appreciated that the vehicle 100 could include any combination of one or more electric motors that are configured to generate propulsive torque. Because the electric motors 120 are configured to generate drive torque at the transmission output shaft 128, the engine 108 could be configured to have a lower cylinder compression ratio, thereby increasing fuel economy. That is, the electric motors 120 are able to compensate for the decreased power density of (and thus a lack of drive torque produced by) such a lower-compression engine, particularly at low loads/speeds. In one exemplary implementation, the engine 108 is an Atkinson-cycle engine comprising six cylinders and having a compression ratio of approximately 12.5:1.

The transmission output shaft 128 is directly coupled to a shaft 136 of a driveline 140 ("driveline shaft 140") of the powertrain 104. There is no disconnect or decoupling clutch disposed therebetween. Gears 144A and 144B having teeth 148A and 148B are coupled to the transmission output and driveline shafts 128, 132, respectively, and interact to transfer torque therebetween. A control system 152 comprises one or more controllers and is configured to control operation of the powertrain 104. The control system 152 also receives parameters from vehicle sensors and/or input devices, such as, but not limited to, an accelerator pedal position sensor 156 that measures a position of an accelerator pedal 160 of the vehicle 100, a transmission gear selector 164 (e.g., a bi-directional lever or a rotary knob), a vehicle speed sensor 168, one or more shaft speed/position sensors 172, and a strain gauge 176. The control system 152 is also configured to apply an electric parking brake (EPB) 180 to prevent movement at the driveline 140.

Figure 2:
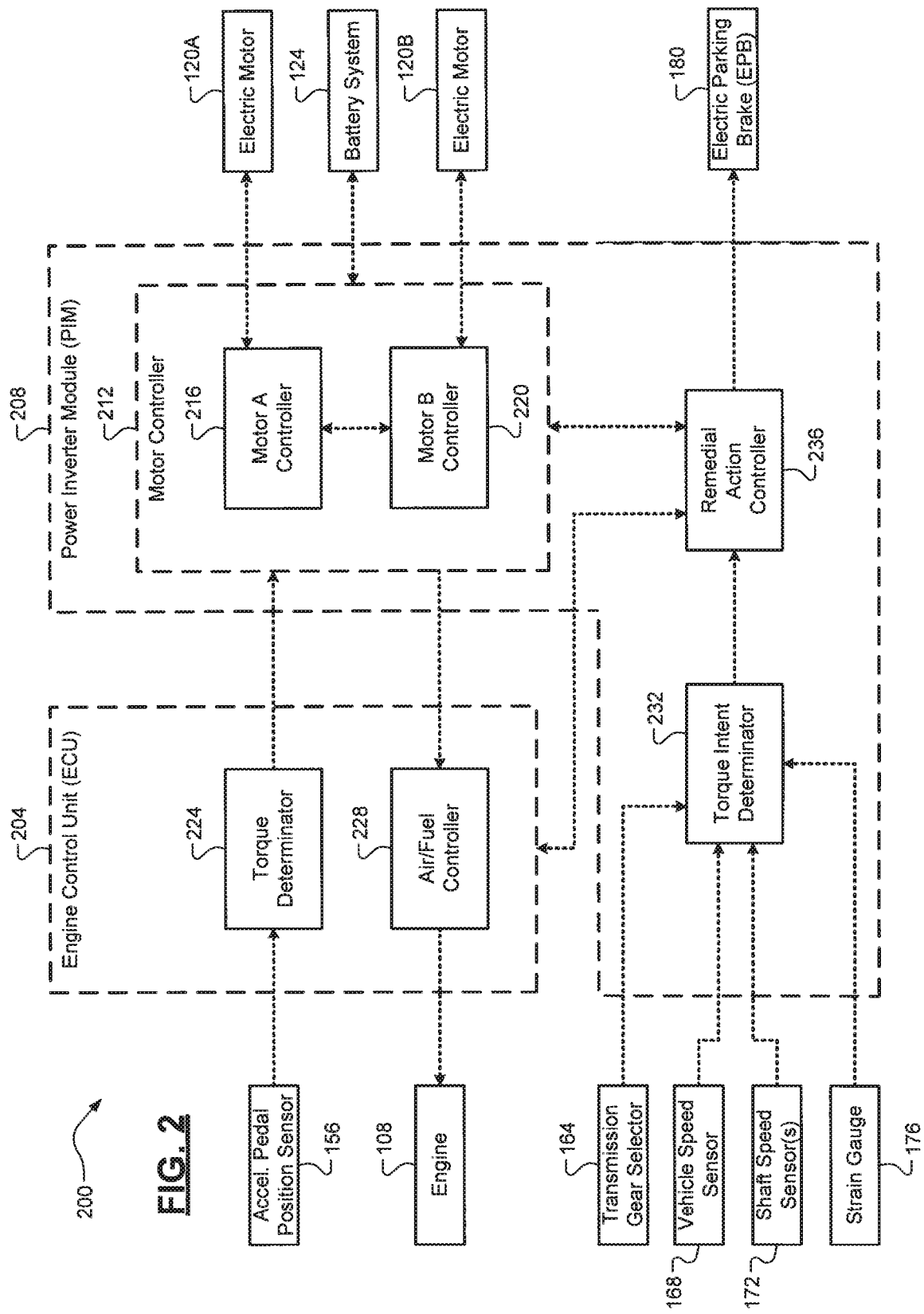
FIG. 2 is a functional block diagram of a control system of the hybrid vehicle according to the principles of the present disclosure.

Referring now to FIG. 2, a functional block diagram of an example configuration 200 of the control system 152 is illustrated. The control system 152 includes an engine control unit (ECU) 204 and a power inverter module (PIM) 208. While this specific configuration is illustrated and discussed herein, it will be appreciated that any number of controllers/sub-controllers could be utilized to implement the techniques of the present disclosure, e.g., a single controller. The ECU 204 controls operation of the engine 108. Specifically, the ECU 204 receives the measured position of the accelerator pedal 160 and a torque determinator 224 determines a desired torque request. The ECU 204 sends this desired torque request to a motor controller 212 of the PIM 208, which in turn determines how the desired torque request is to be achieved via the engine 108 and the electric motors 120. For example, separate motor A and motor B controllers 216 and 220, respectively, could determine how the electric motors 120 are to generate torque.

Various factors affect how the motor controller 212 of the PIM 208 will determine the desired torques $T_E$, $T_A$, and $T_B$, such as the current operating state of the vehicle 100, e.g., an amount of power available from the battery system 124. The PIM 208, e.g., a torque intent determinator 232, also determines a current gear of the transmission 112 (e.g., neutral) based on a signal from the transmission gear selector 164 and determines a current speed of the vehicle 100, e.g., based on a signal from the vehicle speed sensor 168. Based on this received data, the motor controller 212 of the PIM 208 determines the desired torques for the engine 104 and the electric motors 120. The PIM 208 sends the desired engine torque $T_E$ back to an air/fuel controller 228 of the ECU 204, which controls the engine 108 appropriately. The PIM 208 also controls the power supplied to the electric motors 120 appropriately.

According to one aspect of the present disclosure, the torque intent determinator 232 of the PIM 208 is also configured to detect an operating condition where the transmission 112 is in neutral and the vehicle 100 is traveling at a very low speed (e.g., a few miles per hour or less). This operating condition is indicative of a state in which the vehicle 100 could be prone to movement by unintended powertrain propulsive torque. At this operating condition, the output torque at the driveline 140 (e.g., a sum of the actual torques generated by the engine 108 and the electric motors 120) should be zero. However, as previously discussed, other factors may cause the output torque at the driveline 140 to fluctuate from zero.

Therefore, in response to detecting the operating condition, the torque intent determinator 232 of the PIM 208 determines a difference between the desired output torque and the actual output torque at the driveline 140. While the desired torque output is typically based on the accelerator pedal position, when in neutral, the desired output torque could be set to zero (i.e., the accelerator pedal position is ignored). The PIM 208 integrates or accumulates this torque difference over a period and compares accumulated or calculated torque difference to a first movement threshold. This first movement threshold is indicative of an amount of powertrain propulsive torque that will cause the driveline 140 to move by an unacceptable amount. When the accumulated torque difference exceeds this first movement threshold, a remedial action controller 236 of the PIM 208 takes remedial action. In one exemplary implementation, the remedial action controller 236 of the PIM 208 applies the EPB 180, thereby preventing movement at the driveline 140. In another exemplary implementation, the remedial action controller 236 of the PIM 208 sets all desired torques $T_E$, $T_A$, $T_B$ to zero, thereby temporarily disabling the torque generating system 122, e.g., when the accumulated torque difference exceeds a greater second movement threshold.

Not all propulsive torque at the driveline 140 however, is unintended by a driver of the vehicle 100. For example, the vehicle 100 could be on a hill or a grade and gravity could cause movement at the driveline 140. This rolling may be acceptable in certain situations. Similarly, for example, the vehicle 100 could be being pushed by the driver or others, such as to manually roll the vehicle 100 to a service location. In these situations, the driveline 140 is propelling the torque generating system 122 (e.g., the transmission 112). This could also be described as the driveline shaft 136 is driving the transmission output shaft 128. The torque difference between desired/actual propulsive torque, however, is still zero. Similarly, there can be intended propulsion torque generated by the torque generating system 122, the torque generating system 122 (e.g., the transmission 112) is propelling the driveline 140. This could similarly also be described as the transmission output shaft 128 is driving the driveline shaft 136. This detection and handling of intentional or intended propulsive torque is also performed by the torque intent determinator 232 and the remedial action controller 236, as described more fully below.

By determining whether the transmission output shaft 128 is driving the driveline shaft 136 or vice-versa, the torque intent determinator 232 of the PIM 208 is able to discern between intended and unintended propulsive torque at the driveline 140. In some implementations, therefore, when the propulsive torque is intended, no remedial action may be taken by the remedial action controller 236, e.g., the EPB 180 may not be applied. Determining whether the transmission output shaft 128 is driving the driveline shaft 136 or vice-versa could be determined in a variety of ways. For example, interaction between the teeth 144A, 144B of the gears 140A, 140B or, in other words, the system lash, could be monitored, e.g., using the one or more shaft speed or position sensors 172 or the strain gauge 176. Alternatively, for example, at least one of the electric motors 120 could comprise a resolver that outputs a position of the transmission output shaft 128. In yet another example, back electromotive force (EMF) at one or more of the electric motors 120 could be monitored.

Figure 3:
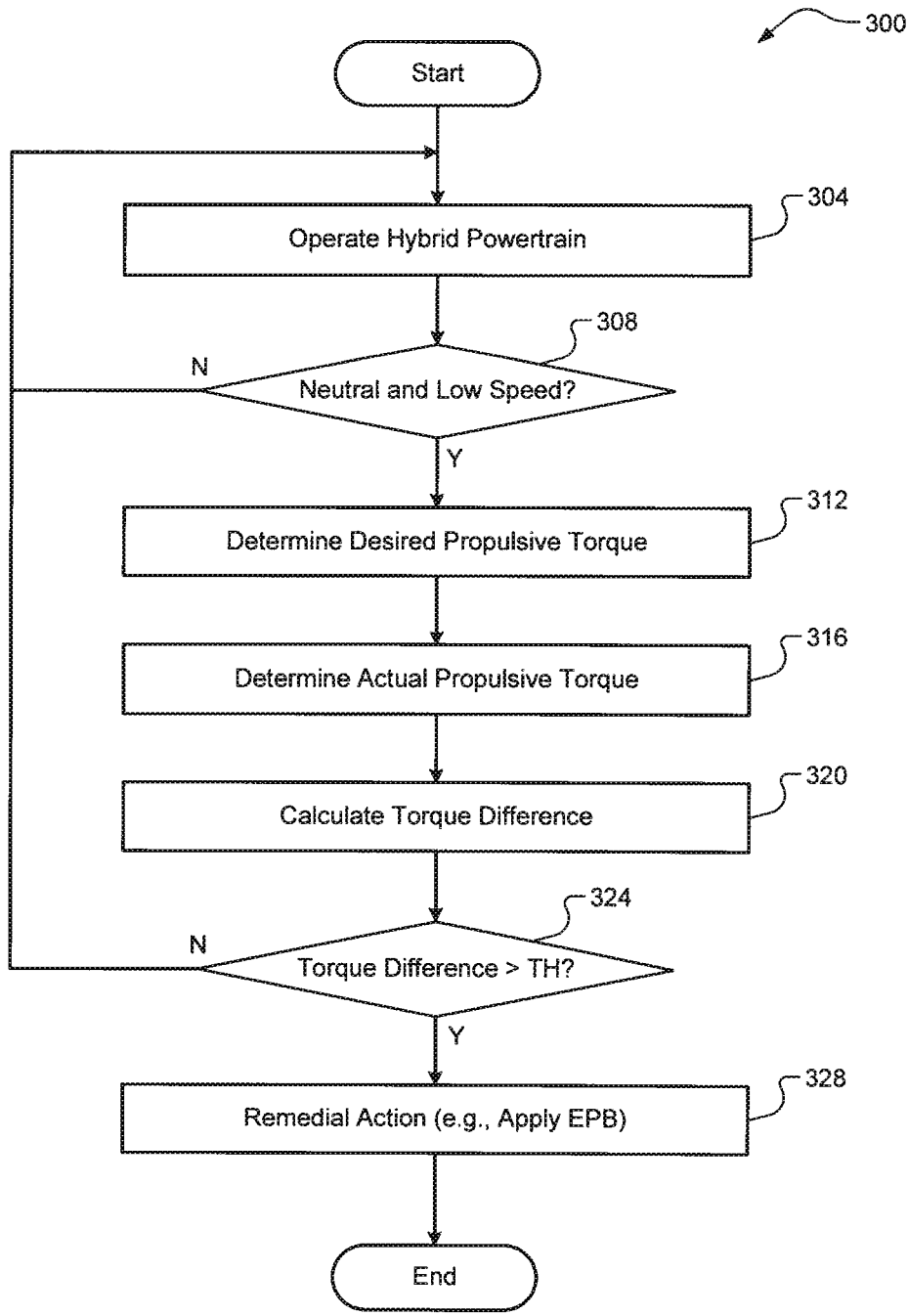
FIG. 3 is a flow diagram of an example method of detecting and monitoring unintended hybrid powertrain propulsive torque according to the principles of the present disclosure.

Referring now to FIG. 3, a flow diagram of an example method 300 of detecting and monitoring unintended hybrid powertrain propulsive torque is illustrated. At 304, the control system 152 operates the hybrid powertrain 104. For example, this could include a start-up procedure for the engine 108 and the electric motors 120. At 308, the control system 152 determines whether the vehicle 100 is operating at a particular operating condition. One example of this operating condition include the transmission 112 being in neutral and the vehicle 100 moving at a speed less than a low speed threshold, such as a few miles per hour. When this operating condition is detected, the method 300 proceeds to 312. Otherwise, the method 300 ends or returns to 304.

At 312, the control system 152 determines a desired propulsive torque of the powertrain 104. At 316, the control system 152 determines an actual propulsive torque being generated by the powertrain 104. As previously discussed, the actual propulsive torque could differ from the desired propulsive torque due to various sources, such as, but not limited to, computation error, memory corruption, and inertia/responsiveness of various components. At 320, the control system 152 calculates a difference or error between the actual and desired propulsive torques to obtain a torque difference. In some implementations, the calculation of the torque difference includes accumulating or integrating the torque difference over a period.

At 324, the control system 152 compares the calculated torque difference to a threshold (TH), such as the first movement threshold and/or the second movement threshold discussed herein. When the calculated torque difference exceeds the threshold, the method 300 proceeds to 328. Otherwise, the method ends or returns to 304. At 328, the control system 152 performs a remedial action. For example, when the calculated torque difference exceeds the first movement threshold, the control system 152 could apply the EPB 180. Additionally or alternatively, for example, when the calculated torque difference exceeds the greater second movement threshold, the control system 152 could set desired torques of the engine 108 and the electric motors 120 to zero for a period, thereby temporarily disabling the powertrain 104. The method 300 then ends or returns to 304 for one or more additional cycles.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A system for a hybrid vehicle, the system comprising:
an electric parking brake (EPB) configured to prevent movement at a driveline of the vehicle; and
a control system configured to:
control a hybrid powertrain of the vehicle, the powertrain comprising an engine and a transmission comprising one or more electric motors, wherein the engine and the one or more electric motors are directly coupled to the driveline of the vehicle without a decoupling mechanism therebetween;
detect an operating condition where the transmission is in neutral and the vehicle is moving at a speed less than a low speed threshold; and
in response to detecting the operating condition:
determine a desired propulsive torque of the powertrain;
determine an actual propulsive torque at the driveline;
calculate a torque difference between the actual and desired propulsive torques over a period;
compare the calculated torque difference to a first movement threshold and determine whether the calculated torque difference is intended or unintended by a driver of the vehicle, wherein the calculated torque difference is unintended by the driver when a shaft of the driveline is driving an output shaft of the transmission and the calculated torque difference is intended by the driver when the transmission output shaft is driving the driveline shaft;
when the calculated torque difference exceeds the first movement threshold and is unintended by the driver of the vehicle, apply the EPB of the vehicle; and
when the calculated torque difference is intended by the driver or does not exceed the first movement threshold, not apply the EPB.

2. The system of claim 1, wherein the control system is configured to determine whether the transmission output shaft is driving the driveline shaft or vice-versa based on measurements from one or more position or speed sensors for one or more of the transmission output shaft and the driveline shaft.

3. The system of claim 1, wherein each electric motor comprises a resolver that outputs a position indicative of a position of the transmission output shaft, and wherein the control system is configured to determine whether the transmission is driving the driveline or vice-versa based on the position of the transmission output shaft.

4. The system of claim 1, wherein the control system is configured to determine whether the transmission output shaft is driving the driveline shaft or vice-versa by utilizing a strain gauge configured to measure a force exerted by gear teeth associated with the transmission output shaft or the driveline shaft.

5. The system of claim 1, wherein the control system is configured to determine that the driveline shaft is driving the transmission output shaft based on a back electro-motive force (EMF) at one of the one or more electric motors.

6. The system of claim 1, wherein the control system is further configured to set a desired torque of each of the engine and the one or more electric motors to zero when the calculated torque difference exceeds a second movement threshold that is greater than the first movement threshold.

7. The system of claim 1, wherein the transmission comprises two electric motors and one or more planetary gear sets.

8. The system of claim 7, wherein when the transmission is in neutral and the engine is on and generating a first torque, the control system is configured to control the two electric motors to generate, via the one or more planetary gear sets, an opposite second torque such that an output torque at the driveline is zero.

9. A method of operating a hybrid vehicle, the method comprising:
controlling, by a control system, a hybrid powertrain comprising an engine and a transmission comprising one or more electric motors, wherein the engine and the one or more electric motors are directly coupled to a driveline of the vehicle without a decoupling mechanism therebetween;
detecting, by the control system, an operating condition where the transmission is in neutral and the vehicle is moving at a speed less than a low speed threshold; and
in response to detecting the operating condition:
determining, by the control system, a desired propulsive torque of the powertrain;

determining, by the control system, an actual propulsive torque at the driveline;

calculating, by the control system, a torque difference between the actual and desired propulsive torques over a period;

comparing, by the control system, the calculated torque difference to a first movement threshold and determining, by the control system, whether the calculated torque difference is intended or unintended by a driver of the vehicle, wherein the calculated torque difference is unintended by the driver when a shaft of the driveline is driving an output shaft of the transmission and the calculated torque difference is intended by the driver when the transmission output shaft is driving the driveline shaft;

when the calculated torque difference exceeds the first movement threshold and is unintended by the driver of the vehicle, applying, by the control system, an electric parking brake (EPB) of the vehicle; and when the calculated torque difference is intended by the driver or does not exceed the first movement threshold, not applying, by the control system, the EPB.

10. The method of claim 9, wherein determining whether the transmission output shaft is driving the driveline shaft or vice-versa is based on measurements from one or more position or speed sensors for one or more of the transmission output shaft and the driveline shaft.

11. The method of claim 9, wherein each electric motor comprises a resolver that outputs a position indicative of a position of the transmission output shaft, and wherein determining whether the transmission is driving the driveline or vice-versa is based on the position of the transmission output shaft.

12. The method of claim 9, wherein determining whether the transmission output shaft is driving the driveline shaft or vice-versa comprises utilizing, by the control system, a strain gauge configured to measure a force exerted by gear teeth associated with the transmission output shaft or the driveline shaft.

13. The method of claim 9, wherein determining that the driveline shaft is driving the transmission output shaft is based on a back electro-motive force (EMF) at one of the one or more electric motors.

14. The method of claim 9, further comprising setting, by the control system, a desired torque of each of the engine and the one or more electric motors to zero when the calculated torque difference exceeds a second movement threshold that is greater than the first movement threshold.

15. The method of claim 9, wherein the transmission comprises two electric motors and one or more planetary gear sets.

16. The method of claim 15, further comprising when the transmission is in neutral and the engine is on and generating a first torque, controlling, by the control system, the two electric motors to generate, via the one or more planetary gear sets, an opposite second torque such that an output torque at the driveline is zero.

* * * * *